United States Patent
Frieder et al.

(10) Patent No.: US 7,028,351 B1
(45) Date of Patent: Apr. 18, 2006

(54) MODULAR PATIENT SUPPORT SYSTEM

(75) Inventors: Russell Frieder, Santa Barbara, CA (US); Srirangam Kumaresan, Goleta, CA (US); Anthony Sances, Jr., Santa Barbara, CA (US); Seong K. Mun, McLean, VA (US); David Renfroe, Fayetteville, AR (US); Will J. Myers, Rogers, AR (US)

(73) Assignee: Calzark, Goleta, CA (US)

( * ) Notice: Subject to any disclaimer, the term of this patent is extended or adjusted under 35 U.S.C. 154(b) by 0 days.

(21) Appl. No.: 11/028,417

(22) Filed: Dec. 30, 2004

(51) Int. Cl.
*A61G 3/00* (2006.01)
*B64D 25/04* (2006.01)

(52) U.S. Cl. .................. 5/118; 5/9.1; 5/627; 244/118.6; 296/19

(58) Field of Classification Search .............. 5/118, 5/8, 9.1, 625, 627, 114, 110–112; 244/118.5, 244/118.6; 296/19, 176
See application file for complete search history.

(56) References Cited

U.S. PATENT DOCUMENTS

| | | | | |
|---|---|---|---|---|
| 2,370,402 A | * | 2/1945 | Gutman | 296/19 |
| 2,473,364 A | * | 6/1949 | Dickinson et al. | 5/9.1 |
| 2,480,322 A | * | 8/1949 | Cozzoli | 244/118.6 |
| 3,028,606 A | * | 4/1962 | Boutet | 5/9.1 |
| 3,358,300 A | * | 12/1967 | Smith | 5/9.1 |
| 3,840,265 A | * | 10/1974 | Stirling et al. | 296/19 |
| 4,360,936 A | * | 11/1982 | Keller | 5/9.1 |
| 4,378,128 A | * | 3/1983 | Holling et al. | 296/19 |
| 4,397,432 A | * | 8/1983 | Resetar | 244/118.6 |
| 5,372,339 A | * | 12/1994 | Morgan | 244/118.5 |
| 5,383,629 A | * | 1/1995 | Morgan | 244/118.6 |
| 6,152,401 A | * | 11/2000 | Green | 244/118.6 |
| 2003/0143052 A1 | * | 7/2003 | Fehrle et al. | 410/46 |

* cited by examiner

*Primary Examiner*—Robert G. Santos
(74) *Attorney, Agent, or Firm*—Michael G. Petit

(57) ABSTRACT

A modular patient support system adapted to be quickly mounted to utility vehicles such as trucks, buses, vans or trailers, to permit emergency medical workers to rapidly transform standard utility vehicles into specialized ambulances. When not in use, the modular patient support system is easily dismounted and collapsed for warehousing. The modular patient support system comprises a base frame that is used to attach the system to a vehicle. The base frame is oriented parallel and adjacent to a side wall of the vehicle. Two telescoping litter supports are attached to the base frame by hinges having a vertical axis of rotation. The two litter supports can either be extended normal to the base frame in order to support a patient on a litter, or collapsed and folded parallel to the base frame. A seat frame is adjustably attached to the base frame using multiple connecting links. When positioned vertically, the seat bottoms serve as mounting surfaces for medical equipment. When positioned horizontally, the seat frame provides restrained seating for multiple patients. Mounting rails permit the secure attachment of equipment and for the positions of the pieces of equipment to be easily adjusted.

6 Claims, 16 Drawing Sheets

MODULAR PATIENT SUPPORT SYSTEM

BACKGROUND OF THE INVENTION

1. Field of the Invention

The present invention relates to a mobile patient life support system, and, more particularly, to a patient life support module adapted for rapid installation within a vehicle and deployment.

2. Prior Art

Mass casualty events, such as wartime battles, natural disasters, and terrorist attacks, often require immediate medical care for large numbers of victims. Emergency treatment of the victims is initiated either at the site where the injury occurred or while in transit to a permanent medical facility. The quality of care, as well as the number of patients that can be cared for, depends greatly on the vehicles tasked with responding to the emergency. Ideally, such vehicles would be equipped with the medical equipment necessary to begin immediate treatment of critical patients, and would also be able to transport multiple patients at a time. It would be additionally beneficial to be able to quickly equip and deploy standard passenger vehicles disposed near the incident site with such medical equipment and patient carrying capacity. Standard (i.e., non-emergency) vehicles that are quickly retrofitted with medical care capabilities are able to transport a larger quantity of victims more efficiently than dedicated ambulances summoned to the site from distant areas.

The best current method for responding to such a catastrophic event is to summon all of the medical response vehicles from a large radius around the affected site, and concentrate them at the location of the mass casualty incident. Due to the wide variety of situations to which ambulances normally respond, they are equipped with a large assortment of medical equipment, much of which is not necessary during these types of emergencies. Much of this equipment takes up considerable space, and is not required for the narrow range of care given during a mass casualty event. Additionally, standard ambulances employ interior organization schemes intended to maximize the comfort and quality of care for only a single patient. The many victims resulting from a mass casualty incident would be best served if vehicles were available that could transport multiple patients at a time. An additional problem with the use of existing ambulances is that by consolidating all of the standard medical response vehicles in a single location, a city's ability handle medical emergencies that occur away from the site of a single major disaster would be seriously diminished. Another problem with this approach is that it is economically impractical for emergency care services to indefinitely maintain fleets of ambulances large enough to respond to mass casualty incidents.

Green, in U.S. Pat. No. 6,152,401, discloses a deployable chair system for use in patient transport aircraft. In one embodiment, the system includes a deployable chair and upper and lower support members for supporting the deployable chair, the deployable chair being pivotally interconnected to the upper support member. In the deployed configuration, the deployable chair is releasably interconnectable to the lower support member, which is one of a floor platform of the aircraft and a vertically adjustable litter platform. In the stowed configuration, the deployable chair is releasably interconnectable to an upper portion of the aircraft, such as a ceiling surface to allow patients to be received on at least one vertically adjustable litter platform located there below. This system is designed to be permanently installed in an aircraft and would be very difficult to quickly mount in a land vehicle. The system is designed to have certain features, such as adjustable height stretcher supports, that would be unnecessary for mass casualty evacuation scenarios. Such features would only serve to increase weight and the total number of moving parts. Both of which would be a disadvantage for a mobile device.

Morgan, in U.S. Pat. No. 5,372,339, discloses a multi-tiered litter rack system generally comprising a plurality of support masts arranged on one wall of an emergency vehicle. The masts support a plurality of vertically spaced litters in at least two horizontally spaced positions. The masts enclose vertical adjustment screws which are adapted to independently adjust the vertical position of each end of the litters for controlling the tilt of and vertical spacing between the litters. The multi-tiered liter rack system further includes individual motors associated with each of the respective masts which are operatively connected to the vertical adjustment screws for controlling the vertical position and tilt of each of the litters. Aside from the mechanism for tilting the litters, this system does not allow for the attachment of emergency medical equipment. The system therefore does not provide a complete patient care package.

Holling et al., in U.S. Pat. No. 4,378,128, discloses a patient support system comprised of two stretcher supports that are mounted against the wall of an ambulance. The supports are mounted on rails, allowing the height of each end of the stretchers to be independently adjusted. The stretcher supports are also capable of folding flat against the wall of the ambulance. This feature allows the upper stretcher support to be folded back, while the lower support is used as a seat. The back end of the system is capable of pivoting about a vertical axis, in order to increase the ease of loading and unloading. This system is intended to be permanently mounted in a vehicle, and would therefore not be suitable for rapid attachment and detachment.

Other patient support systems for emergency vehicles have been disclosed. Illustrative of such devices are U.S. Pat. Nos. 2,370,402, 2,483,025, 2,473,364, 2,480,322, 3,358,300, 4,783,025 and 6,691,952. Not withstanding the aforesaid prior art devices, there remains a need for a modular patient support device for providing emergency care and transport for an injured patient that can be rapidly installed in standard non-emergency utility vehicles such as vans thereby transforming the vehicle into a medical care platform. The device should be modular, lightweight, self contained, and be easily mounted to a wide variety of vehicles. The device should incorporate all of the medical equipment necessary for emergency care, yet not include some of the less critical features and comforts of a standard ambulance.

SUMMARY

In essence, the present invention is a modular patient support device adapted to be quickly attached to a vertical wall in a vehicle, thereafter the device being operable for storing and presenting patient medical support equipment while the vehicle transports an injured person to a medical care facility. The device comprises an elongate base frame having a length and a pair of telescopically adjustable base supports affixed to opposing ends thereof wherein the telescopically adjustable base supports are extendable in a direction orthogonal to the length. The base frame further includes first attachment means thereon operable for attaching the base frame to a vertical wall in the vehicle. A somewhat rectangular seat frame having a length that is substantially coextensive with the length of the base frame is rotatably mounted on the base frame. At least two, and more preferably four, telescopically adjustable litter supports are attached to the base frame. At least two of the litter supports are designed to support the poles of the litter, while additional supports may be used to support the legs of the litter. The litter supports are extendable in a direction orthogonal to both the length of the base frame and the direction of extendability of the pair of adjustable base supports. The device further includes a plurality of seat bottoms having an upper surface and a lower surface. The seat bottoms are adapted to be (preferably releasably) attached to the seat frame. At least one mounting rail is attached to the lower surface of each of the seat bottoms. The mounting rails provide second attachment means operable for attaching emergency medical equipment thereto.

The mobile patient support system in accordance with the present invention is intended to serve personnel tasked with responding to mass casualty incidents. The invention offers a superior method of transporting and caring for injured patients. The system includes structures necessary to support patients lying on litters, but may also be configured to provide restrained upright seating for patients with lesser injuries. In addition to providing a means for safely transporting patients, the system includes a mounting mechanism used to attach various types of emergency medical equipment. This equipment may include emergency medical devices, communication devices, and power sources. The device in accordance with the present invention is novel in that it is adapted to be quickly mounted to virtually any utility vehicle such as, for example, a truck, bus, van or trailer. This capability allows emergency medical services to rapidly transform standard utility vehicles into specialized ambulances. When not in use, the mobile patient support system is easily dismounted and collapsed into a manageable shape that maximizes storage efficiency for warehousing. While the invention may be most effective when used in road vehicles, it is also suitable for use in trains, helicopters, airplanes, etc.

The mobile patient support system comprises a base frame that is used to attach the system to a vehicle. The base frame is preferably held in place by telescoping base supports, tie-down straps, or a combination of the two. The base frame is oriented parallel to and coincident with the side wall of a vehicle. Attached to the base frame, by hinges having a vertical axis of rotation, are two telescoping litter supports that can either be extended normal to the base frame in order to support a patient on a litter, or collapsed and folded parallel to the base frame. A seat frame is attached to the base frame using multiple connecting links. The seat frame is connected in such a way that it can either be positioned normal to the base frame, and supported by the extended litter supports, or rotated upwardly and rearwardly so that it is positioned parallel to, and coincident with, the base frame. When positioned vertically, the seat bottoms serve as mounting surfaces for medical equipment, and when positioned horizontally, the seat frame provides restrained seating for multiple patients. The vertical position of the seat frame is also used for transport, storage, or providing more interior cargo room within a vehicle.

Integral to the seating frame are mounting rails to which equipment brackets may be attached. The rails allow for the positions of the pieces of equipment to be easily adjusted. This allows the support system to accept a wide variety of equipment sizes and types. By employing mounting rails on both sides of the seat frame, the system is easily configured to treat a patient resting on a litter, or multiple patients seated atop the seat frame. The rail mounting system also allows pieces of medical equipment to be easily attached and detached, so that they may remain with a patient who has been removed from the support system.

The present invention is directed to a modular patient mobile support device and method for using the device that substantially obviates one or more of the limitations of the related art. The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
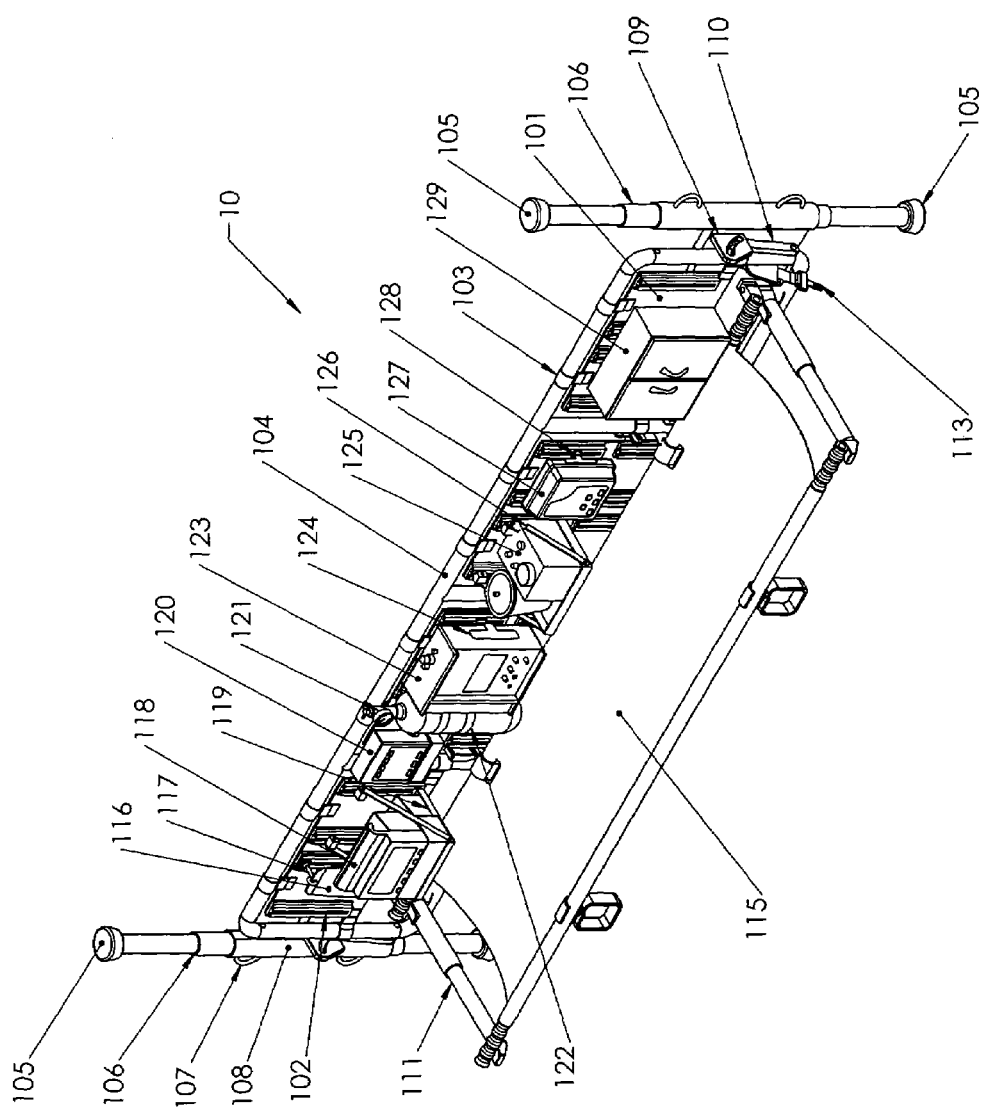
FIG. 1 is a perspective view of a modular patient medical support device in accordance with a litter-carrying configuration of the present invention.

A modular patient medical support device in accordance with a litter-carrying configuration of the present invention is illustrated in perspective view at numeral 10 in FIG. 1.

The modular patient medical support device 10 comprises a base frame 108 which provides support for the seating, equipment-mounting and litter support components 111 as will be discussed below. The base frame 108 provides the primary structural rigidity and strength for the modular patient medical support device 10. The base frame 108 is preferably made from fiber-reinforced polymers or a low density metal. The lateral ends of the base frame are rigidly attached to telescoping base supports 106. The base supports 106 are vertically extendable and have tie down members 107 rigidly attached thereto to permit secure attachment of the base frame 108 and the modular patient medical support device 10 to (and release from) an inner vertical wall of a vehicle (not shown). The tie down members 107 can also be used for carrying the modular patient medical support device to and away from the vehicle. The base supports 106 are individually adjustable thereby permitting the modular patient medical support device 10 to conform to the interior dimension of a variety of vehicle types and roof heights. Opposing ends of each base support 106 are fitted with a base support foot 105 which is an elastomeric pad operable for gripping the floor and ceiling panels of the vehicle. Alternate embodiments of the invention may substitute the base support foot 105 for pegs (not shown) that would fit into preinstalled holes in the ceiling and floor of a vehicle.

When the modular patient medical support device 10 is to be used in the litter-supporting configuration shown in FIG. 1, a pair of telescoping litter supports 111 that are rotatably mounted on the base frame 108 are deployed to project forwardly from the base frame 108. The telescoping litter supports 111 provide support for either the support poles for the litter 115 or the longitudinal member of the seat frame 104 as will be discussed below. The upper surfaces of the telescoping litter supports 111 have locking means (not shown) attached thereto operable for securely attaching the litter poles, equipment or seat frame thereto. Portions of other elements that comprise the modular patient medical support device 10, including seat members and equipment, are visible in FIG. 1. For example, much of the emergency equipment 115–129 is attached to the seat bottoms 101 for easy access to emergency workers when the device is in the litter-carrying configuration of FIG. 1. An upper portion of the four seat frames 104 are integral with the base frame 108. A seat frame bracket 109 is rigidly attached to the base frame 108. The seat frame bracket 109 includes a curved bearing surface that allows the seat frame 104 to correctly rest upon the telescoping litter supports 111 when the modular patient medical support device 10 is configured to seat patients. Seat straps 103 are disposed on the base frame to secure a person in the seat when in a seated configuration and to support the seat bottoms 101.

Figure 5:
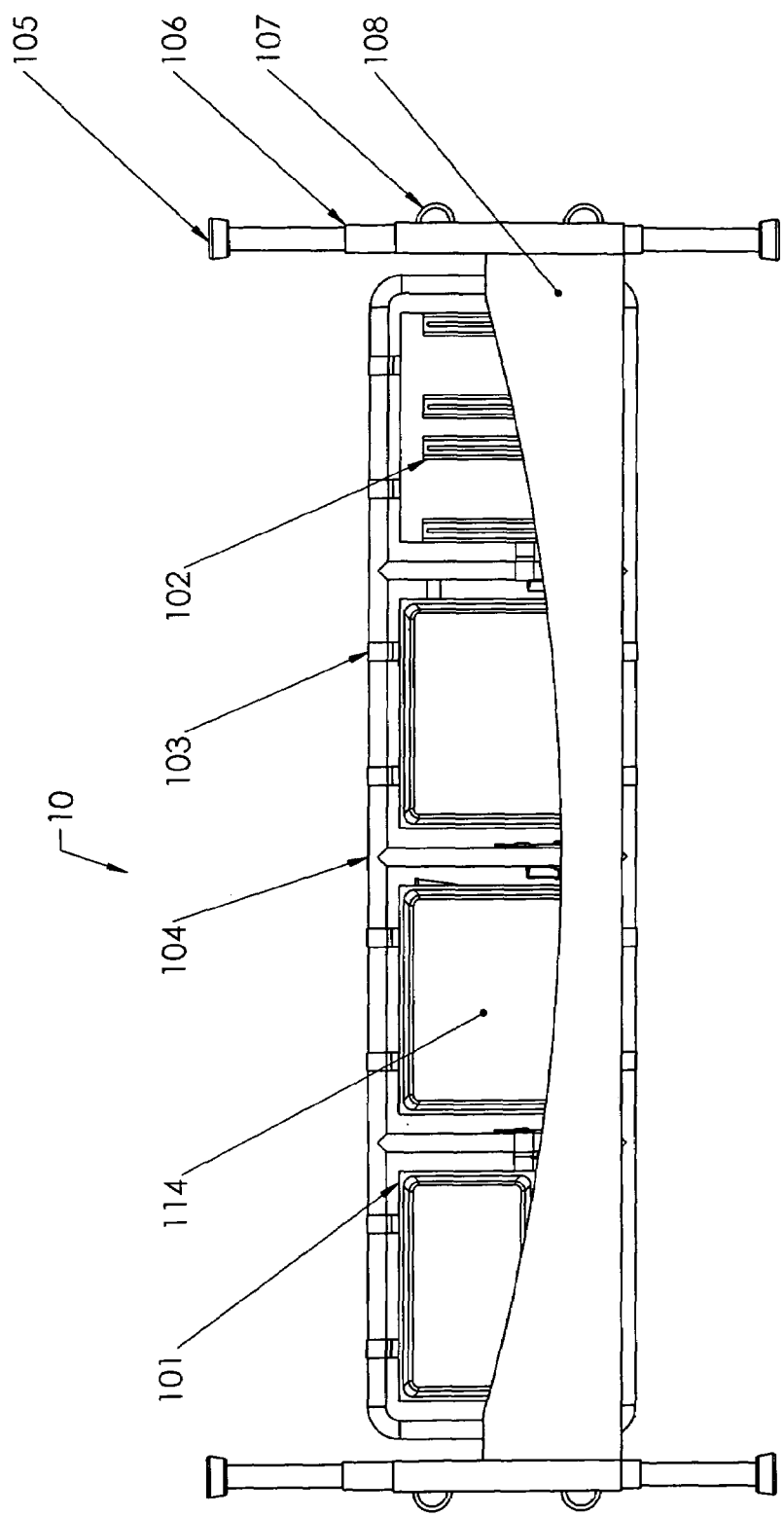
FIG. 5 is a rear elevational view of the litter-carrying configuration of the modular patient medical support device of FIGS. 1–4.

The seat bottoms 101 are rigid plates that are attached to the seat frames 104 by the seat straps 103. The upper surface of the seat bottoms may be covered with a seat cover 114 (FIG. 5). Equipment is attached to the lower surfaces of the four seat bottoms 101 by means of mounting rails 102 that are rigidly attached to the seat bottoms 101. The mounting rails provide means for attaching various items of emergency medical equipment to the four seat bottoms. Exemplary of such medical equipment is an IV bag 116, an IV bag bracket 117 (that allows an IV bag to be mounted to any mounting rail), a vital signs monitor 118, a vital signs monitor support 119, an infusion pump 120, an oxygen cylinder 121, an oxygen cylinder strap 122, a ventilator 123, a ventilator bracket 124, a suction device 125, a suction device support 126, a defibrillator 127, a defibrillator bracket 128 and a supply cabinet 129.

Figure 2:
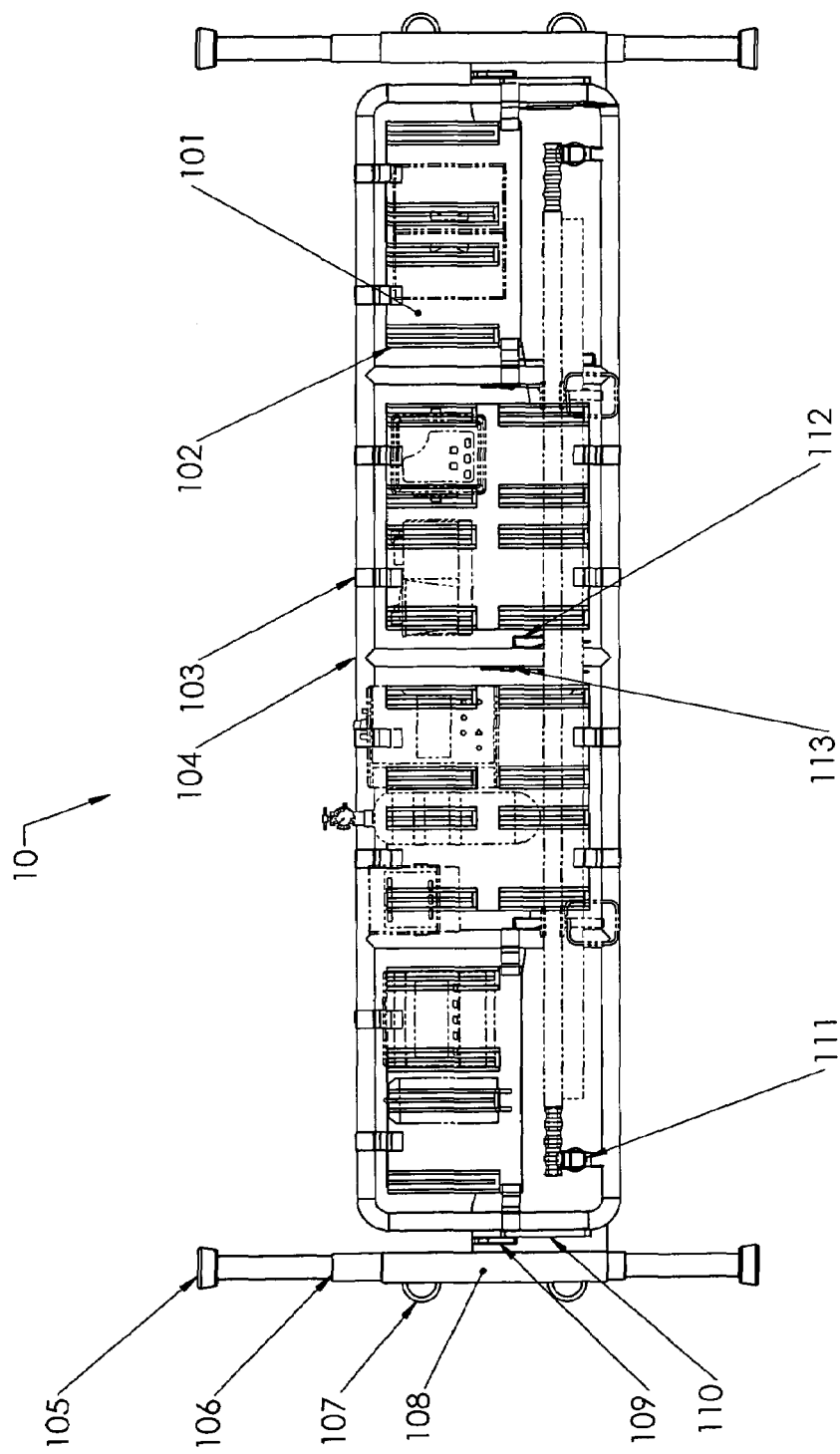
FIG. 2 is a front view of the litter-carrying configuration of the modular patient medical support device of FIG. 1.
Figure 3:
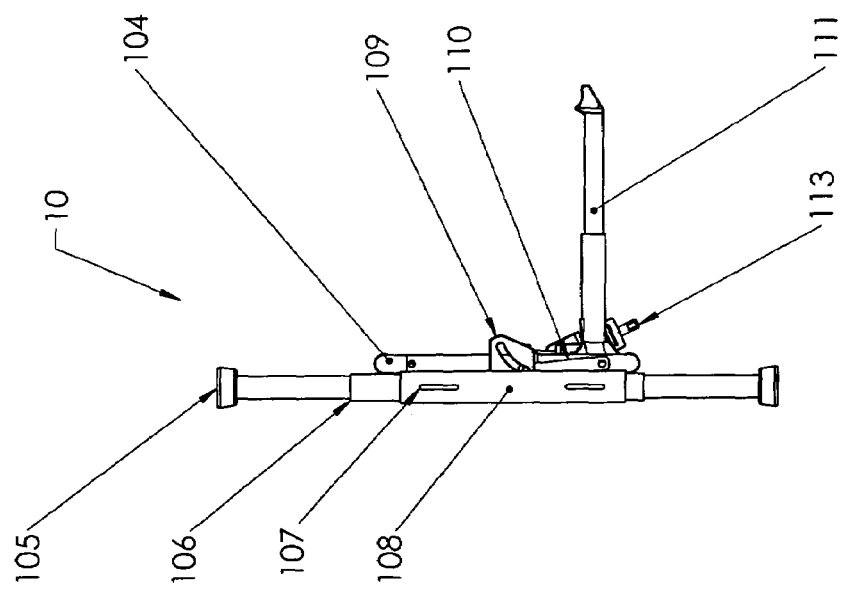
FIG. 3 is a left side view of the litter-carrying configuration of the modular patient medical support device of FIGS. 1 and 2.
Figure 4:
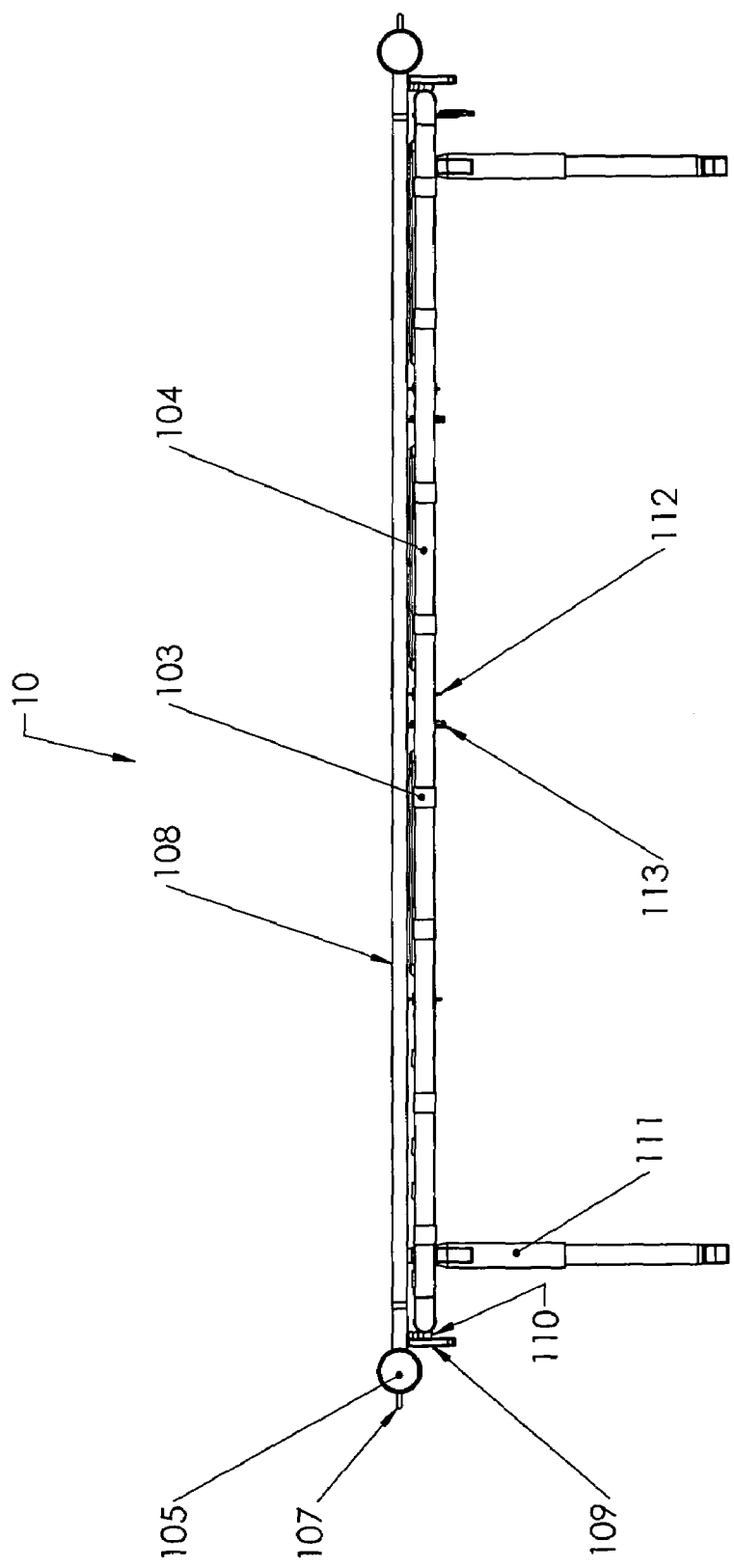
FIG. 4 is a top view of the litter-carrying configuration of the modular patient medical support device of FIGS. 1–3.

FIG. 2 is a front view of the litter-carrying configuration of the modular patient medical support device of FIG. 1. A seat belt buckle 112 and a seat belt latchplate 113 are visible in FIGS. 2 and 4. The seat belts, which terminate in buckle 112, are mounted to the seat frame in order to provide a restraining means for transporting patients in a seated position. FIG. 3 is a left side view of the litter-carrying configuration of the modular patient medical support device of FIGS. 1 and 2. FIG. 4 is a top view of the litter-carrying configuration of FIGS. 1–3 and FIG. 5 is a rear elevational view of the litter-carrying configuration of the modular patient medical support device of FIGS. 1–4. As mentioned above, a seat frame bracket 109 is rigidly attached to the base frame 108. The seat frame bracket 109 includes a curved bearing surface that allows the seat frame 104 to correctly rest upon the telescoping litter supports 111 when the modular patient medical support device 10 is configured to seat patients as is illustrated in FIGS. 6–10. With reference to FIG. 3, a seat frame connecting link 110 is pivotally affixed to the seat frame 104 and connects the seat frame 104 to the seat frame bracket 109. The length of the seat frame connecting link 110 determines the motion and resting locations of the seat frame 104.

Figure 6:
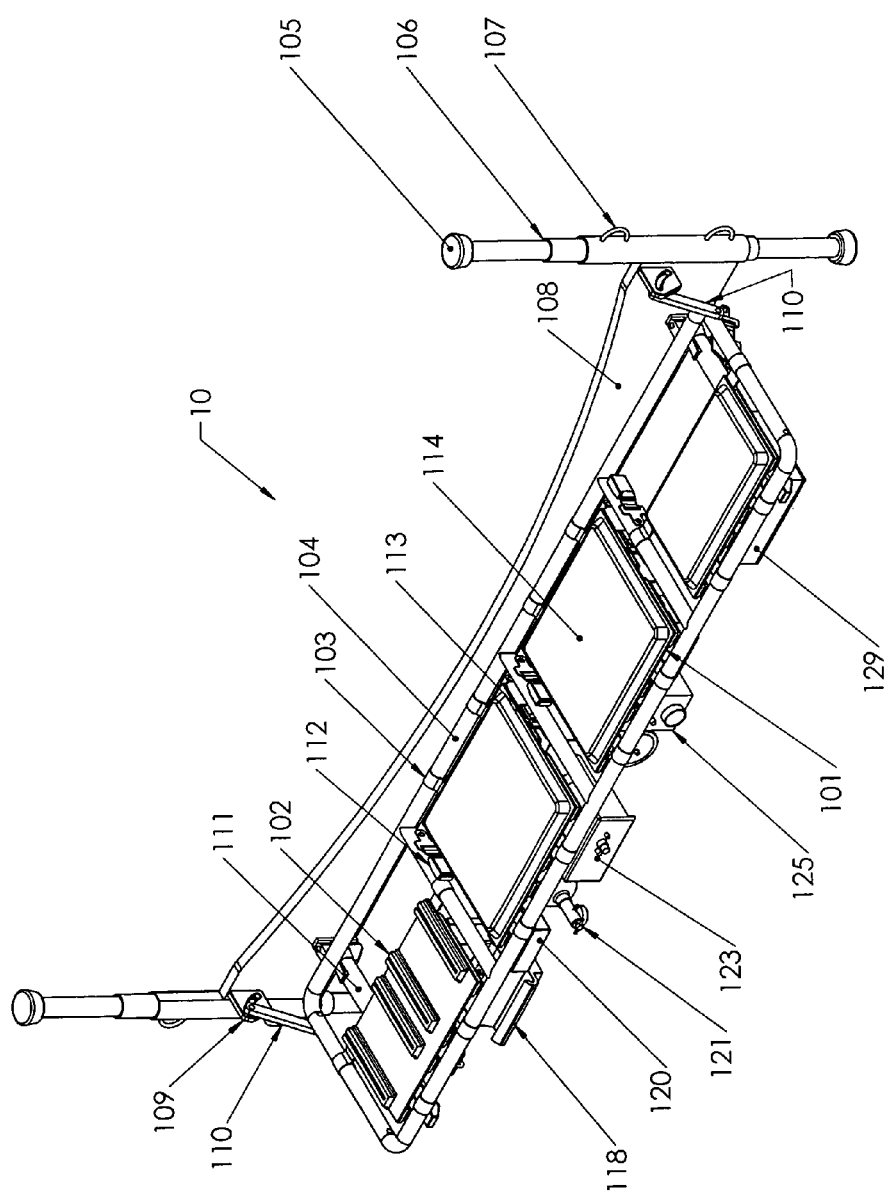
FIG. 6 is a perspective view of a modular patient medical support device in accordance with a seated patient configuration of the present invention.
Figure 7:
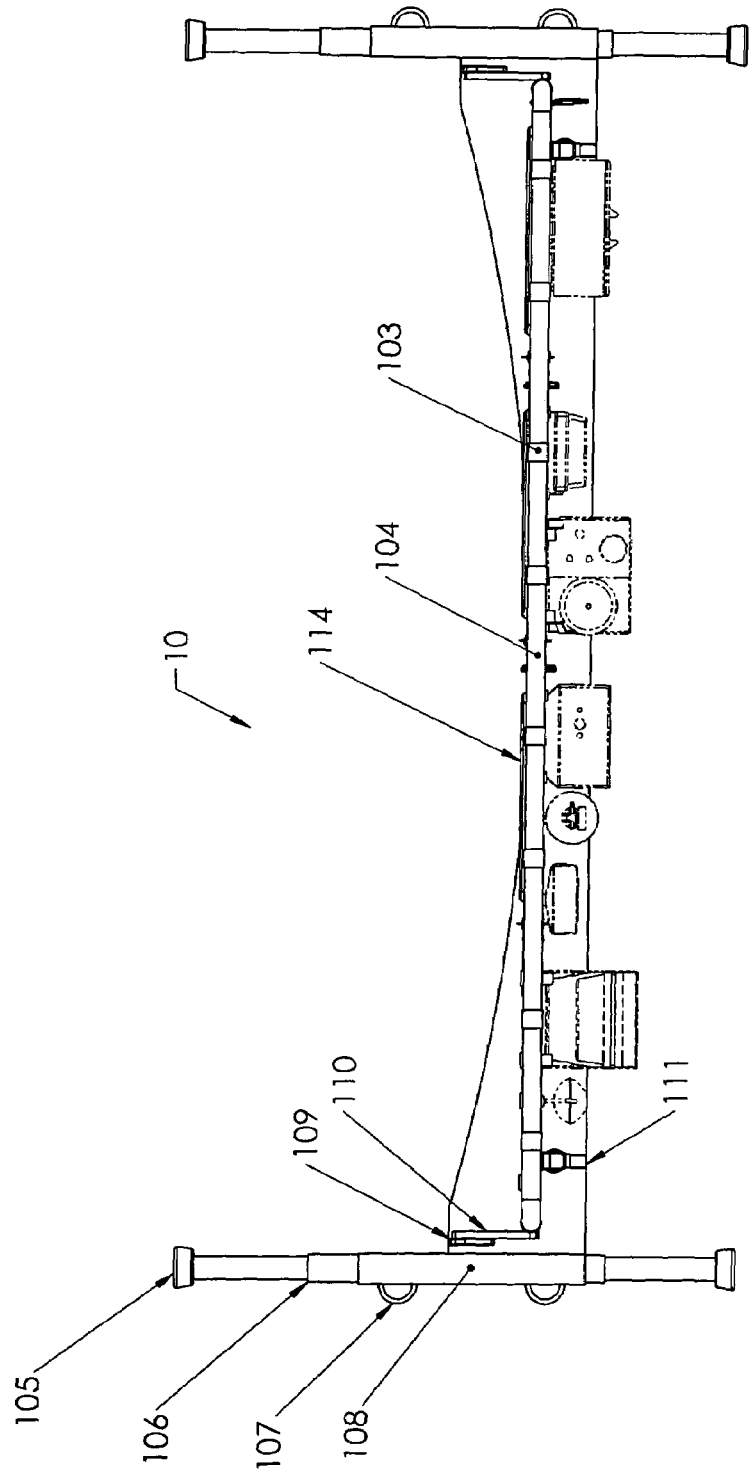
FIG. 7 is a front view of the seated patient configuration of the modular patient medical support device of FIG. 6.
Figure 8:
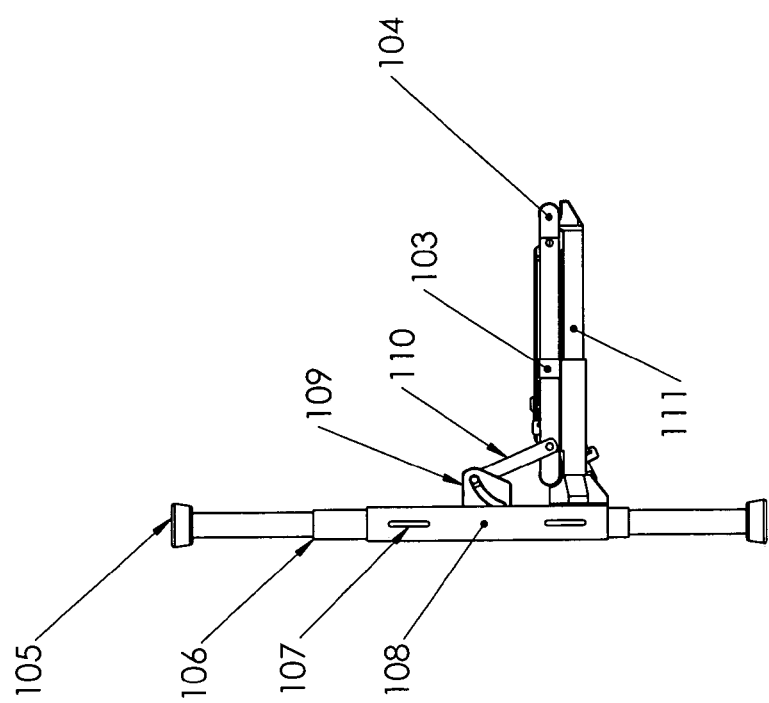
FIG. 8 is a left side view of the seated patient configuration of the modular patient medical support device of FIGS. 6–7.
Figure 9:
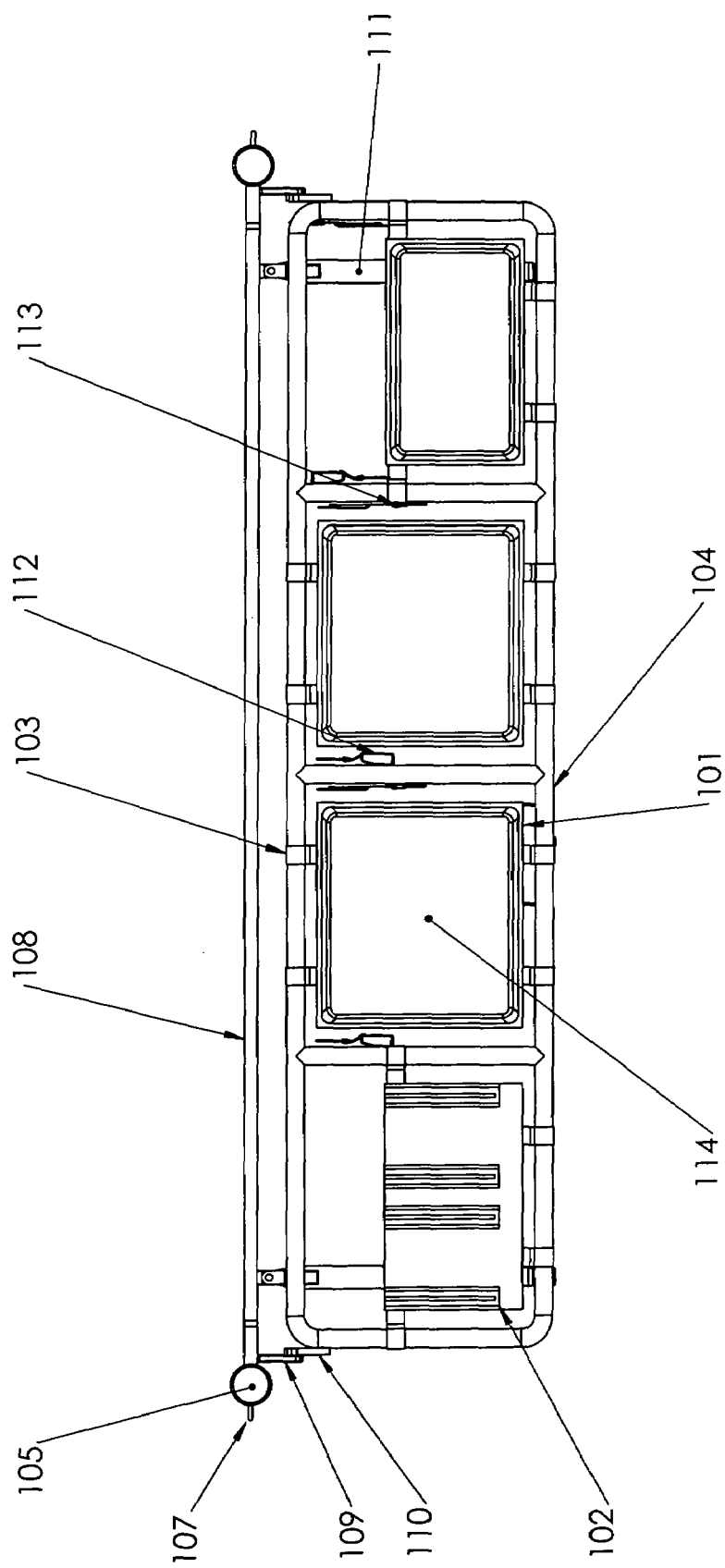
FIG. 9 is a top view of the seated patient configuration of the modular patient medical support device of FIGS. 6–8.
Figure 10:
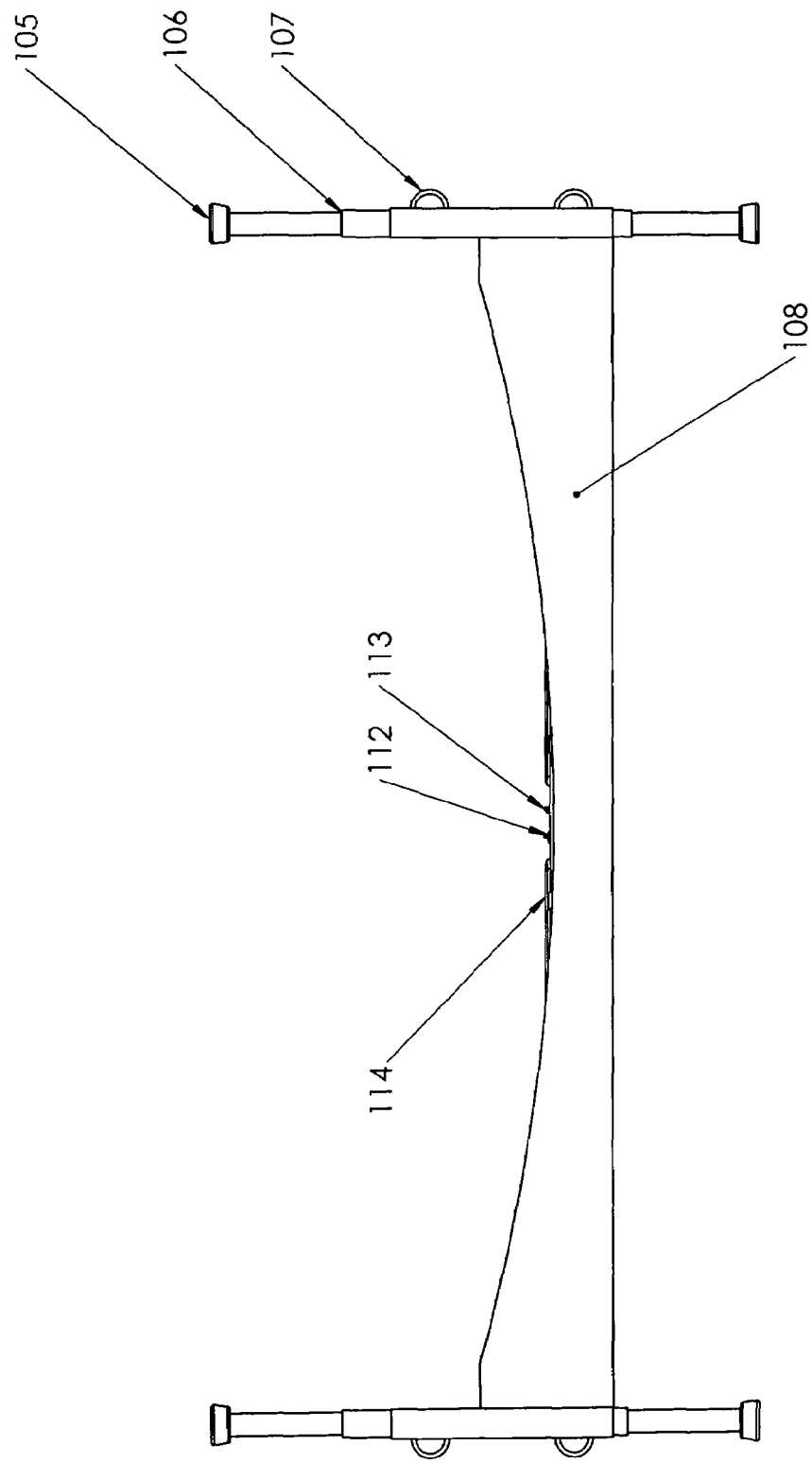
FIG. 10 is a rear elevational view of the seated patient configuration of the modular patient medical support device of FIGS. 6–9.

FIGS. 6–10 illustrate the modular patient medical support device 10 in a seated configuration. This "seated" configuration is used when the patient(s) being transported can safely remain in a seated position during transport. FIG. 6 is a perspective view of a seated configuration of the modular patient medical support device 10. In the seated configuration the telescoping litter supports are extended from the base frame 108 and the seat frame 104 is rotated forwardly to the extent permitted by the seat frame connecting link 110 to position the seat bottom 101 in a horizontal plane suitable for seating a patient. Seat cushions 114 are preferably placed upon the seating surface for comfort. It is noted in FIG. 6 that the seat on the left is installed on the seat frame with the bottom of the seat facing upwardly to access the mounting rails 102 attached thereto. This reversible feature enables attending medical personnel to access critical emergency equipment that can be attached to the mounting rails. Since the equipment attached to the remaining seat bottoms is out of view, it is preferable to mount the emergency equipment 118–126 such that the equipment controls are accessible when the device 10 is configured to seat patients. FIG. 7 is a front view of the seated patient configuration of the modular patient medical support device of FIG. 6. FIG. 8 is a left side view of the seated patient configuration of the modular patient medical support device of FIGS. 6–7 wherein the structure and operation of the seat frame bracket 109 and the seat frame connecting link is apparent. FIG. 9 is a top view of the seated patient configuration of the modular patient medical support device of FIGS. 6–8 and FIG. 10 is a rear elevational view of the seated patient configuration.

Figure 11:
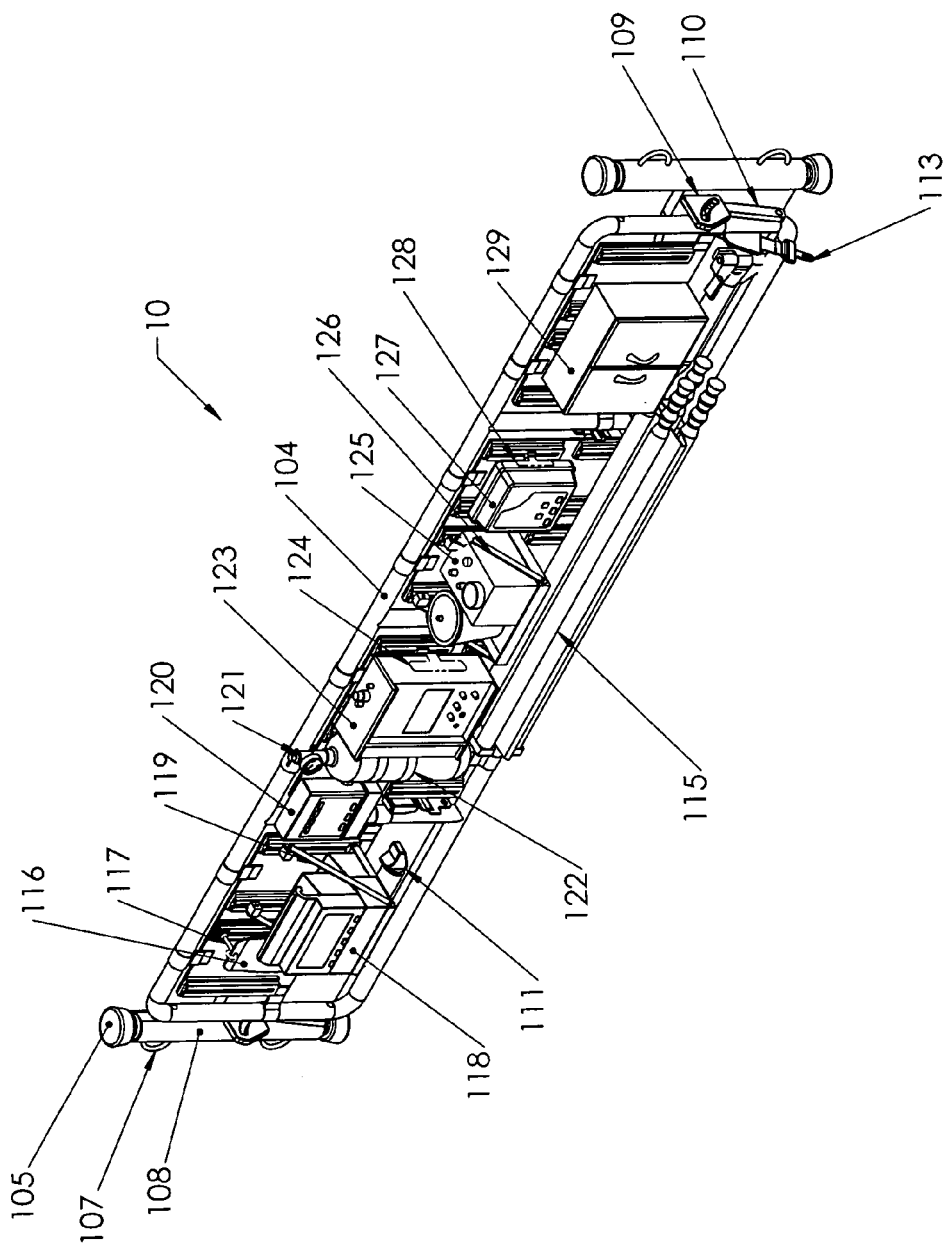
FIG. 11 is a perspective view of a modular patient medical support device in accordance with a fully collapsed configuration of the present invention.
Figure 12:
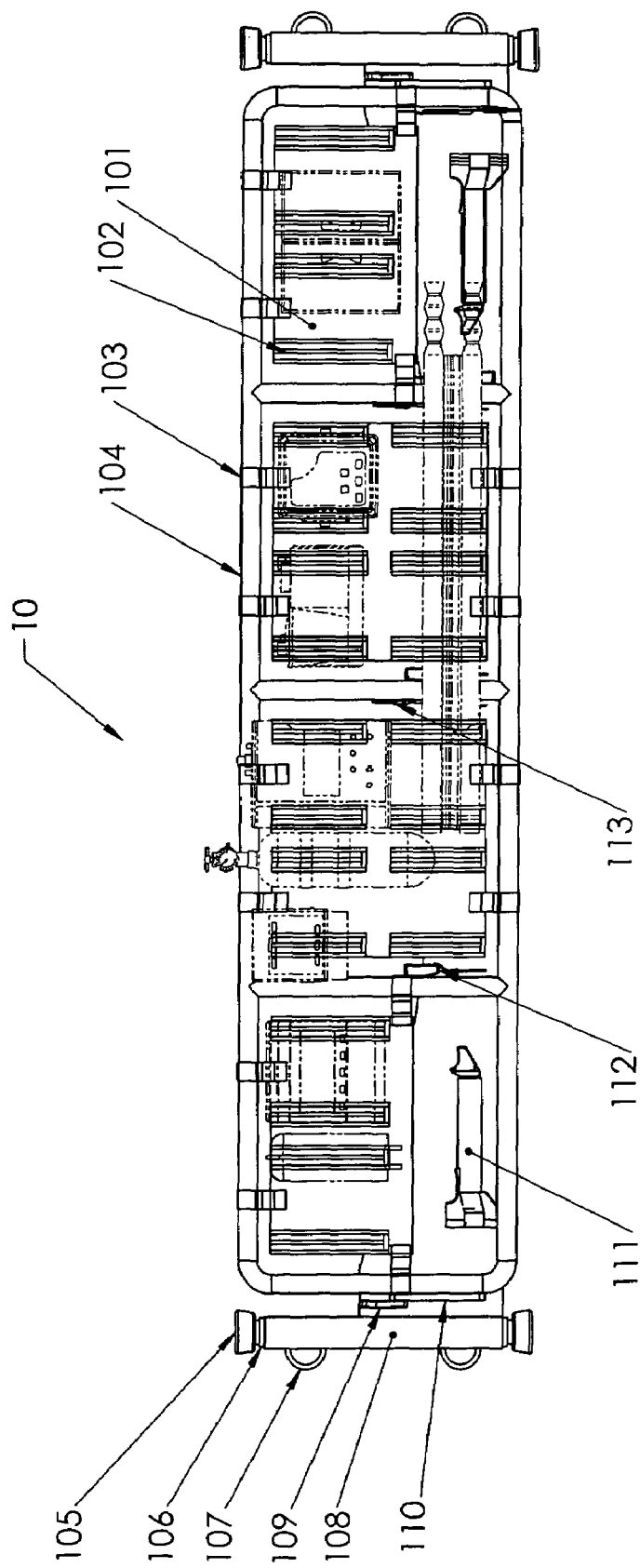
FIG. 12 is a front view of the fully collapsed configuration of the modular patient medical support device of FIG. 11.
Figure 13:
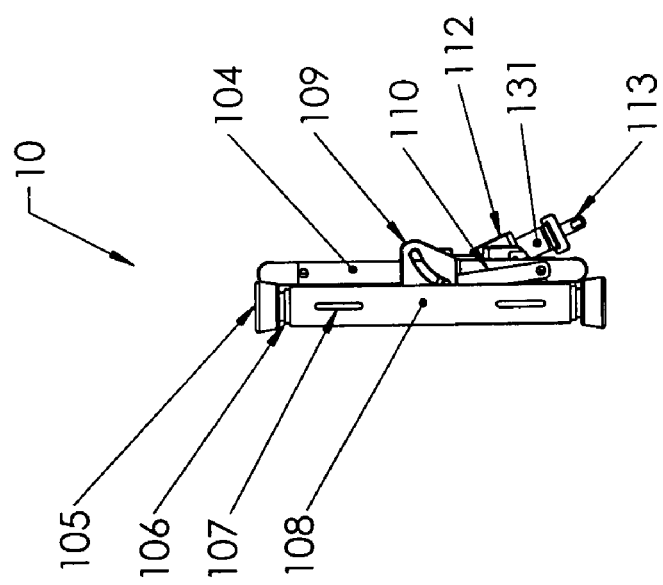
FIG. 13 is a left side view of the fully collapsed configuration of the modular patient medical support device of FIGS. 11–12.
Figure 14:
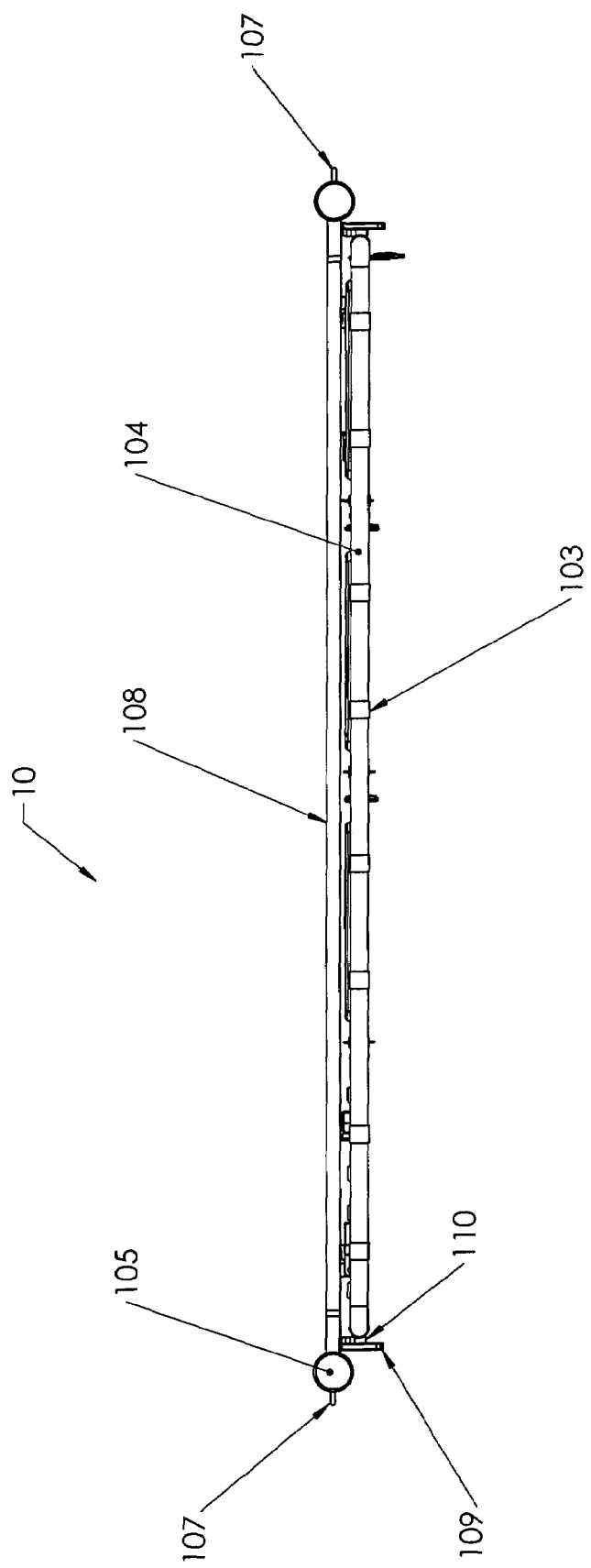
FIG. 14 is a top view of the fully collapsed configuration of the modular patient medical support device of FIGS. 11–13.
Figure 15:
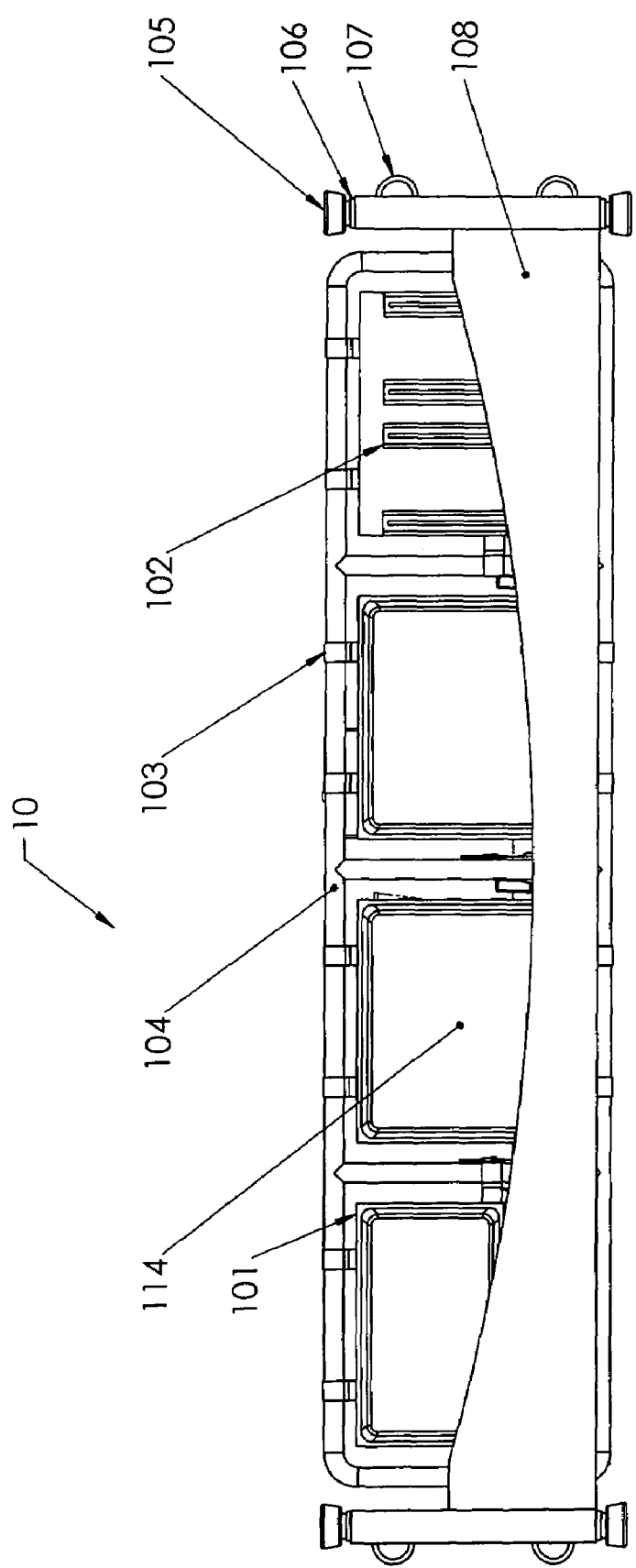
FIG. 15 is a rear elevational view of the fully collapsed configuration of the modular patient medical support device of FIGS. 11–14.
Figure 16:
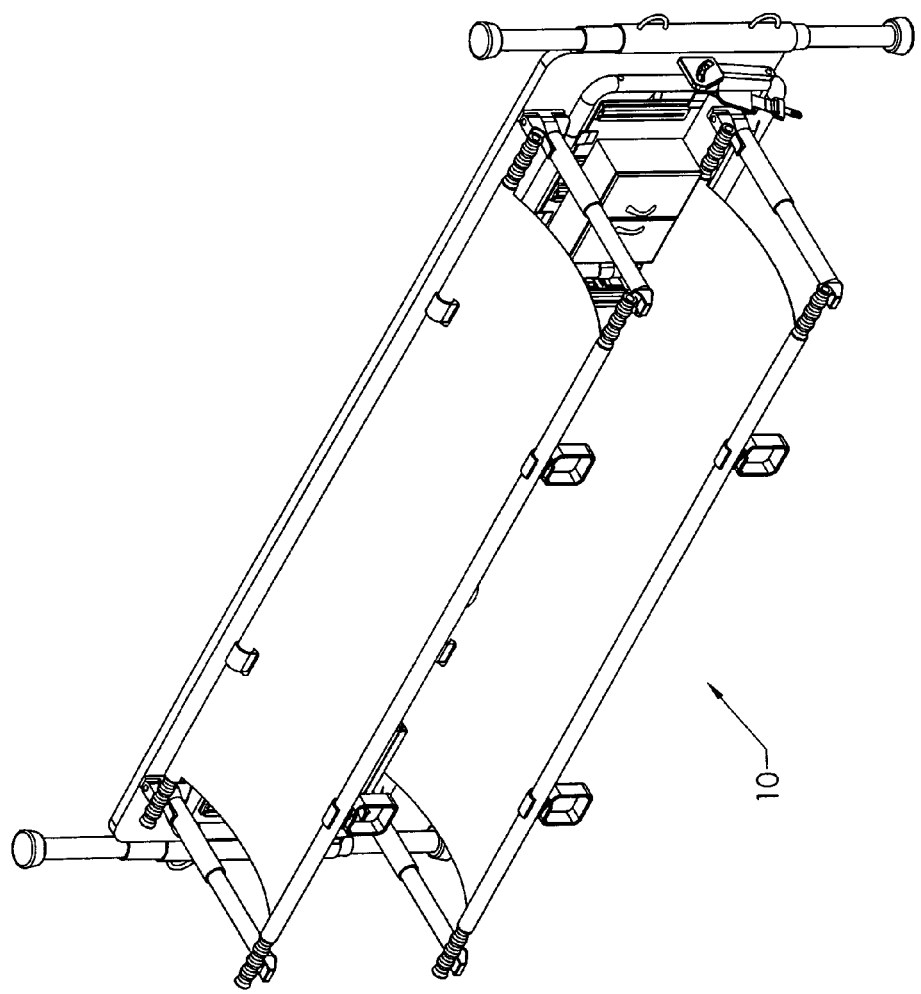
FIG. 16 is a perspective view of a modular patient medical support device in accordance with an alternate embodiment of the present invention.

In addition to having the ability for quick installation of the device 10 in a vehicle to be deployed for emergency response, another important feature of the present invention is that the modular patient medical support device 10 is collapsible in order to enable space-saving warehousing when not in use. During such non-use periods, the host vehicle(s) can be employed for non-emergency utility purposes until needed. A collapsed configuration of the modular patient medical support device 10 is illustrated in perspective view in FIG. 11, front view in FIG. 12, left end view in FIG. 13, top view in FIG. 14 and rear view in FIG. 15. The seat belt 131, terminating with the seat belt buckle 112 attached thereto, is visible in FIG. 13. An alternative embodiment of the modular patient medical support device 10 having upper and lower telescoping litter supports for transporting more than one litter is shown in perspective view in FIG. 16.

When an emergency event occurs with injuries, one or more of the utility vehicles are dispatched to the warehouse. The modular patient medical support device 10 is removed from storage and, preferably supported by the tie down loops 107, carried to the vehicle in the collapsed configuration and placed within the vehicle. The telescoping base supports are extended downwardly to support the base frame and the tie down loops are attached to support structures which have been preinstalled on a vertical wall of the vehicle to engage the tie down loops. The tie down loops may also be secured using ropes, chains, straps, etc. to preexisting features inherent to the vehicle, such as stock seatbelt mounting locations. The telescoping base supports are then extended upwardly to press against the roof of the vehicle in order to further stabilize the device. The telescoping base supports on the upper portion of the base frame are left unused when the device is installed in a pickup truck or other roofless vehicle. Emergency medical equipment is attached to the mounting rails affixed to the seat bottoms and the vehicle is dispatched to the emergency site. The telescoping litter supports are then rotated outwardly from the base frame and extended to an appropriate length. If patients must be transported by a litter, the litter is placed on the telescoping litter supports. If the patients may be transported while seated, one or more of the seat frames is rotated downwardly from the base frame to a position determined by the seat frame connecting link to provide seats for patients and/or emergency workers as needed. The medical equipment is accessible to the emergency responders to provide emergency treatment for the patient(s) while being transported to a medical care facility. Multiple units may be installed within a single host vehicle depending on the amount of available cargo area.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A modular patient support device adapted to be quickly attached to a vertical wall in a vehicle, thereafter the device being operable for providing patient medical support equipment while the vehicle transports an injured person to a medical care facility, the device comprising: (a) a substantially rectangular base frame having a length and a pair of telescopically adjustable base supports affixed to opposing ends thereof wherein said telescopically adjustable base supports are extendable in a direction orthogonal to said length, said base frame having first attachment means thereon operable for attaching said base frame to a vertical wall in the vehicle; (b) a seat frame rotatably mounted on said base frame; (c) at least two telescopically adjustable litter supports attached to said base frame, said litter supports being extendable in a direction orthogonal to both said length and said direction of extendability of said adjustable base supports; and (d) a seat bottom having an upper surface and a lower surface releasably attached to said seat frame.

2. The modular patient support device of claim 1 wherein said telescopically adjustable base supports are extendable in two opposing directions.

3. The modular patient support device of claim 1 wherein said telescopically adjustable base supports have engagement means on opposing ends thereof operable for preventing said ends of said base supports from sliding relative to a surface of a vehicle in contact therewith.

4. The modular patient support device of claim 1 wherein at least one mounting rail is attached to said lower surface of said seat bottom, said mounting rail providing second attachment means operable for attaching emergency medical equipment thereto.

5. The modular patient support device of claim 1 wherein said first attachment means comprise tie down loops rigidly affixed to said telescopically extendable base supports.

6. The modular patient support device of claim 1 wherein said first attachment means comprise tie down loops rigidly affixed to said substantially rectangular base frame.

* * * * *